Patented Apr. 29, 1952

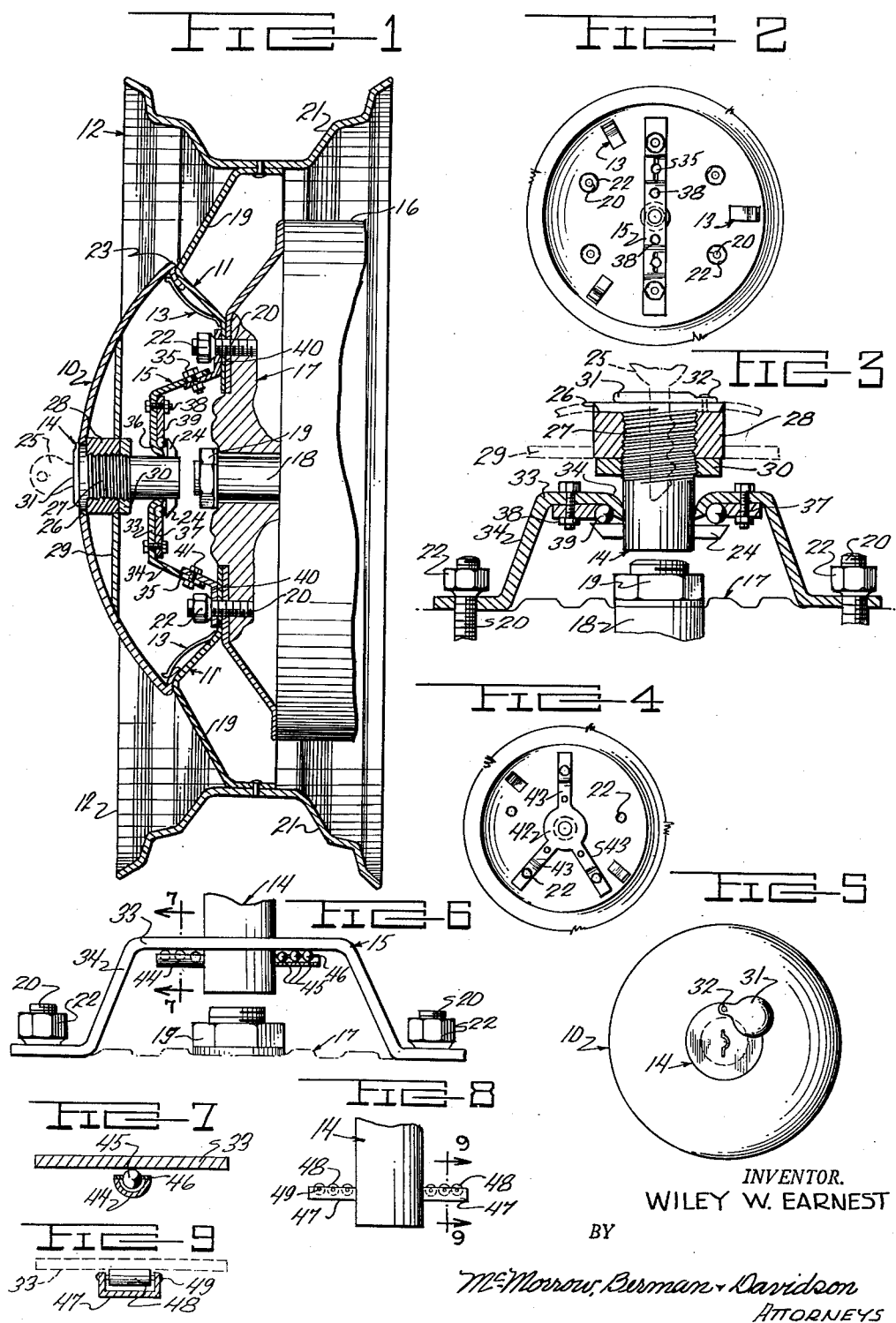

2,594,407

UNITED STATES PATENT OFFICE 2,594,407

HUBCAP LOCK

Wiley W. Earnest, Beaumont, Tex.

Application March 15, 1949, Serial No. 81,455

1 Claim. (Cl. 70—169)

This invention relates to hub cap locks for automobile wheels, and more particularly to an improved lock inter-connected between the hub cap and the hub of an automobile wheel to prevent unauthorized removal of the hub cap or the wheel.

It is among the objects of the invention to provide an improved hub-cap-lock assembly in which the lock is permanently attached to the hub cap and cannot be accidentally misplaced or lost and a lock bar or keeper is detachably secured to the wheel hub by the conventional hub bolts, so that the cap can be secured to the hub at or near the center of the cap to provide a connection of maximum strength between the cap and the hub, in which suitable anti-friction means are provided in the assembly to facilitate key operation of the lock, and which assembly is simple and durable in construction, economical to manufacture, and provides a neat and attractive appearance which does not, in any way, detract from the appearance of the ornamental hub cap.

Other objects and advantages will become apparent from a consideration of the following description and the appended claim in conjunction with the accompanying drawing, wherein—

Figure 1 is a diametrical cross-section through an automobile wheel and hub cap showing a hub cap lock illustrative of the invention assembled therewith;

Figure 2 is a front elevation on a reduced scale of the wheel hub showing the application thereto of a lock bar or keeper constituting a component of the improved lock assembly;

Figure 3 is a cross-section similar to Figure 1 on a somewhat enlarged scale of the improved lock assembly, showing the details of construction thereof;

Figure 4 is a view similar to Figure 2 showing a somewhat modified form of lock bar or keeper;

Figure 5 is a front elevation of a hub cap with a lock assembled therein;

Figure 6 is a view similar to Figure 3 showing a somewhat modified construction of lock assembly;

Figure 7 is a transverse cross-section on an enlarged scale on the line 7—7 of Figure 6;

Figure 8 is a side elevation of a fragmentary portion of a lock showing a still further modification of the lock construction; and Figure 9 is a transverse cross-section on the line 9—9 of Figure 8.

With continued reference to the drawing, there is illustrated, in general, a concavo-convex hub cap 10 secured in the hub 11 of a conventional automobile wheel 12 by the usual spring-latch means 13 and secured to the wheel hub against unauthorized removal by an assembly comprising a lock 14 secured to the cap and a lock bar or keeper 15 removably secured within the wheel hub 11.

The wheel-and-hub structure is conventional and comprises a brake drum 16 having a web secured to a drum flange 17 which is mounted on an axle or spindle 18 and secured thereon by a suitable nut 19. Whether the drum flange 17 is journaled on the axle or drivingly connected thereto, depends upon whether a front wheel or a rear driving wheel is under consideration.

The wheel has an annular web 19, the inner portion of which is provided with spaced-apart apertures to receive the hub bolts or studs 20 and the wheel rim 21 is secured to the periphery of the web 19. The bolt 20 may be either a bolt end or stud secured in the drum flange 17 to project through the corresponding aperture in the wheel web 19, and may be provided with a nut threadable onto its outer end to secure the wheel to the hub, or may be a stud bolt having a head engageable with the wheel web to secure the wheel to the brake drum flange. For purposes of illustration in the present case, it will be assumed that the elements 20 each comprises a stud secured in the flange 17 and provided with a nut 22 threadable onto the outer end.

The hub cap 10 is beaded around its edge, as indicated at 23, to provide a flange fitting into the edge of the annular hub 11, and the spring latch devices 13 may be of any desired or conventional form.

The wheel hub thus constitutes an annular, hollow body having an open end with bolt ends projecting into the interior thereof opposite such open end, there being nuts threadable on the bolts to secure such hollow, annular body in operative assembly, and the hub cap 10 constitutes a cover plate for the open end of such body.

The lock 14 is a conventional cylinder lock having near one end diametrically-projectible, beveled dogs 24, and internal tumblers or pins so arranged that a proper key 25 must be inserted into the key opening in the lock to retract the dogs. The dogs are spring-projected so that the locking is automatic when the dogs are forced past a cooperating keeper. The hub cap 10 is centrally apertured to receive the lock barrel and the lock barrel is welded to the hub cap around the barrel-receiving aperture, as indicated at 26. Adjacent its outer end the lock barrel is provided with external screw threads 27, which are threaded into an internally-screw-threaded sleeve 28 secured at one end to the inner surface of the hub cap 10 surrounding the lock-barrel-receiving aperture and secured at its opposite end to a reinforcing plate 29 marginally secured within the concave side of the hub cap and provided with an aperture receiving the sleeve 28. A suitable lock nut 30 threaded on the screw-threaded portion of the lock barrel and bearing against the inner end of the sleeve 28 assists in securing the lock barrel firmly in the hub cap. A shield 31 is pivotally connected at its edge to the outer end of the lock barrel by suitable pivot pin 32 to normally cover the key opening in the outer end of the lock barrel, this shield being movable away from the key opening in the conventional manner when it is desired to insert a key in the lock.

The locking bar 15 comprises a flat, generally U-shaped bar having a substantially straight intermediate bight 33 and a pair of substantially straight, divergent legs 34 having respective slots 35 adjacent their outer ends. The bight 33 is provided substantially at its mid-length location with a lock-receiving aperture having an inwardly-turned or rounded outer edge 36 to facilitate entry of the latch dogs 24 into the aperture. An annular plate or washer 37 is secured to the inner side of the bight 33 of the lock bar surrounding the rounded edge 36 by suitable screws 38 and this plate carries, at its inner edge, a plurality of anti-friction balls 39, one side of which bear against the bight of the lock bar surrounding the lock-receiving aperture, and the opposite sides of which are exposed for engagement by the surfaces of the lock dogs 24 adjacent the lock bar. These balls 39 provide anti-friction means to facilitate key operation of the lock dogs to permit these lock dogs to be easily projected by spring pressure, and to be easily retracted by operation of the key 25.

A respective angle bracket 40 is secured to the outer end of each leg 34 of the locking bar by a respective screw or bolt 41 extending through the corresponding slot 35 and through a suitable bolt-receiving aperture in the bracket. These brackets are provided, near their outer ends, with apertures to receive corresponding bolt ends 20, so that when the nuts 22 are threaded onto these bolt ends extending through the apertures in the lock bar brackets 40, the lock bar will be firmly attached to the wheel hub. The slotted connections between the angle brackets and the legs of the remainder of the lock bar render the lock bar adjustable to accommodate it to different wheel hubs in which the bolt ends 20 are disposed on circles of somewhat different diameters.

A straight lock bar, as particularly illustrated in Figure 2, is used where the hub is provided with at least two diametrically-oppositely-disposed bolt ends 20. Where the arrangement of the bolt ends is such that no two of them are diametrically opposite, a modified form of lock bar, as illustrated in Figure 4, is used. This lock bar has a generally circular, centrally apertured, intermediate portion 42, and three angularly-spaced-apart legs 43 projecting radially from the central portion 42. If desired, the angle brackets 40 may be omitted, and the legs extended and apertured to receive the bolt ends 20, as illustrated in Figures 3 and 6. In the case of the modified bar shown in Figure 4, the legs may be provided with bolt-end-receiving apertures and arranged to receive three of the bolt ends projecting through the inner side of the wheel hub to secure the hub to the brake drum flange. The U-shaped formation of the locking bar is sufficiently deep so that the bight of the locking bar extends over the outer end of the axle 18 and is sufficiently spaced therefrom to permit the lock barrel to pass through the lock-receiving aperture in the bight of the lock bar far enough for the dogs 24 to engage under the lock bar adjacent the lock-receiving aperture.

In the modified arrangement shown in Figures 6 and 7, the annular plate 37 and anti-friction balls 39 are omitted and the locking dogs 44 are provided with longitudinally-grooved or concave upper faces and a plurality of anti-friction balls 45 are secured in the grooved upper face of each locking dog by a suitable cage 46. The cage has apertures therein slightly smaller than the maximum circumference of the balls, and the major portion of the balls is disposed between this cage and the bottom of the grooved upper face of the locking dog, so that the balls cannot fall out of the cage. At the same time the balls will provide an effective anti-friction means between the locking dogs and the under surface of the bight 33 of the locking bar 15 so that the locking dogs can be easily projected and retracted to lock the hub cap to the hub, or release it therefrom.

In the further modified arrangement shown in Figures 8 and 9, the locking dogs are of channel-shaped cross-section with open upper sides and a plurality of rollers 48 are journaled in each dog by respective axle pins 49 extending through and secured in the flanges of the channel-shaped locking dogs. These rollers, likewise, provide an effective-friction means between the locking dogs and the under surface of the bight of the lock bar or keeper, so that the dogs may be easily projected and retracted with the rollers in engagement with the under surface of the bar.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In combination with a dished annular body having bolt receiving apertures and a cover for one side of said body, a flat bar longitudinally U-shaped extending across the interior of said body and having bolt receiving apertures adjacent its ends, bolts securing said bar to said body, said bar having a lock receiving aperture therein intermediate its ends, a lock barrel secured to said cover and having a key opening exposed at the outer surface of said cover and its inner end spaced from the inner side of said cover, locking dogs slidably carried in said lock barrel adjacent the inner end thereof for key operated projection and retraction laterally of said barrel, the inner end of said lock barrel with said locking dogs being insertable through the lock receiving aperture in said bar and said dogs being projectable at the side of said bar remote from said cover to lock said cover to said body, and anti-friction means carried by said bar adjacent said lock aperture and on the opposite side of said bar from said cover to be engaged by said dogs, said bar having a rounded edge portion surrounding the lock receiving aperture therein and said anti-friction means comprising a flat ring secured to said bar and having its inner edge circumferentially spaced from said rounded edge portion of the bar, and anti-friction balls disposed between the rounded edge portion of said bar and the inner edge of said ring.

WILEY W. EARNEST.

REFERENCES CITED

The following references are of record in the file of this patent:

UNITED STATES PATENTS

| Number | Name | Date |
|---|---|---|
| 2,005,535 | Duarte | June 18, 1935 |
| 2,095,891 | Riess et al. | Oct. 12, 1937 |
| 2,109,664 | Fergueson | Mar. 1, 1938 |
| 2,240,400 | Johnson | Apr. 29, 1941 |
| 2,328,301 | Shaw, Jr. | Aug. 31, 1943 |
| 2,535,126 | Flowers et al. | Dec. 26, 1950 |

FOREIGN PATENTS

| Number | Country | Date |
|---|---|---|
| 594,256 | France | June 15, 1925 |